US012470027B2

(12) United States Patent
He et al.

(10) Patent No.: US 12,470,027 B2
(45) Date of Patent: Nov. 11, 2025

(54) CONNECTOR MODULE AND CONNECTOR

(71) Applicant: Tyco Electronics (Shanghai) Co., Ltd., Shanghai (CN)

(72) Inventors: Hua He, Shanghai (CN); Yingchun (David) Wang, Shanghai (CN); Yong (Chris) Wang, Shanghai (CN); Daokuan (Jeremy) Zhang, Shanghai (CN)

(73) Assignee: Tyco Electronics (Shanghai) Co., Ltd., Shanghai (CN)

(*) Notice: Subject to any disclaimer, the term of this patent is extended or adjusted under 35 U.S.C. 154(b) by 306 days.

(21) Appl. No.: 18/354,815

(22) Filed: Jul. 19, 2023

(65) Prior Publication Data

US 2025/0030204 A1 Jan. 23, 2025

(30) Foreign Application Priority Data

Jul. 20, 2022 (CN) ........................ 202221882066.4

(51) Int. Cl.
*H01R 13/6581* (2011.01)
*H01R 13/405* (2006.01)
*H01R 13/6597* (2011.01)

(52) U.S. Cl.
CPC ....... *H01R 13/6597* (2013.01); *H01R 13/405* (2013.01); *H01R 13/6581* (2013.01)

(58) Field of Classification Search
CPC ............ H01R 13/6597; H01R 13/6581; H01R 13/405; H01R 13/652; H01R 13/659; H01R 13/6582; H01R 13/8583
USPC .................................................... 439/607.34
See application file for complete search history.

(56) References Cited

U.S. PATENT DOCUMENTS 7,077,668 B2 * 7/2006 Lapidot .............. H01R 13/6471 439/108
7,980,859 B2 * 7/2011 Mizumura ......... H01R 13/6315 439/63
8,137,116 B2 * 3/2012 Omori ...................... H01R 4/64 439/92
11,837,806 B2 * 12/2023 Brhel ................. H01R 13/6272
2011/0143592 A1 * 6/2011 Marchetti ............ H01R 13/658 439/607.34
2012/0276757 A1 * 11/2012 Matsuoka .......... H01R 13/6594 439/55
2013/0149902 A1 * 6/2013 Tsuchiya .............. H01R 12/724 439/607.34
2016/0064852 A1 * 3/2016 Saitoh ................ H01R 13/5202 439/626

(Continued)

*Primary Examiner* — Harshad C Patel
(74) *Attorney, Agent, or Firm* — Barley Snyder

(57) ABSTRACT

A connector module comprises a shielding shell, an inner insulator, a signal terminal, and a ground terminal. The shielding shell includes a shell body having an inner cavity and a terminal clamping portion located outside the shell body and connected to the shell body. The inner insulator includes an insulating body housed in the inner cavity of the shell body and a terminal holding portion protruding to the outside of the shell body. The signal terminal is located in the inner cavity of the shell body and is fixed to the insulating body. The ground terminal is located outside of the shell body and is inserted into the terminal holding portion of the inner insulator. The terminal clamping portion of the shielding shell clamps the ground terminal to electrically connect the ground terminal to the shielding shell.

20 Claims, 5 Drawing Sheets

(56) References Cited

U.S. PATENT DOCUMENTS

| | | | | |
|---|---|---|---|---|
| 2016/0099522 | A1 * | 4/2016 | Suzuki | H01R 11/03 439/101 |

* cited by examiner

CONNECTOR MODULE AND CONNECTOR

CROSS-REFERENCE TO RELATED APPLICATIONS

This application claims the benefit of Chinese Patent Application No. CN202221882066.4 filed on Jul. 20, 2022, in the State Intellectual Property Office of China, the whole disclosure of which is incorporated herein by reference.

FIELD OF THE INVENTION

The present invention relates to a connector module and a connector including the connector module.

BACKGROUND

In the prior art, for a connector with a power terminal and a signal terminal, in order to prevent the signal terminal from being interfered by the power terminal, a shielding shell needs to be installed outside the signal terminal. In order to improve the shielding effect of the connector, it is sometimes necessary to position a ground terminal outside the shielding shell, which is in electrical contact with the shielding shell. However, in the prior art, the portion of the ground terminal in contact with the shielding shell is usually suspended and not fixed, which is prone to shaking, resulting in unstable electrical contact between the ground terminal and the shielding shell, affecting the grounding effect and electromagnetic shielding effect.

SUMMARY

According to an embodiment of the present disclosure, a connector module comprises a shielding shell, an inner insulator, a signal terminal, and a ground terminal. The shielding shell includes a shell body having an inner cavity and a terminal clamping portion located outside the shell body and connected to the shell body. The inner insulator includes an insulating body housed in the inner cavity of the shell body and a terminal holding portion protruding to the outside of the shell body. The signal terminal is located in the inner cavity of the shell body and is fixed to the insulating body. The ground terminal is located outside of the shell body and is inserted into the terminal holding portion of the inner insulator. The terminal clamping portion of the shielding shell clamps the ground terminal to electrically connect the ground terminal to the shielding shell.

BRIEF DESCRIPTION OF THE DRAWINGS

The invention will now be described by way of example with reference to the accompanying Figures, of which.

DETAILED DESCRIPTION OF THE EMBODIMENTS

Figure 1:
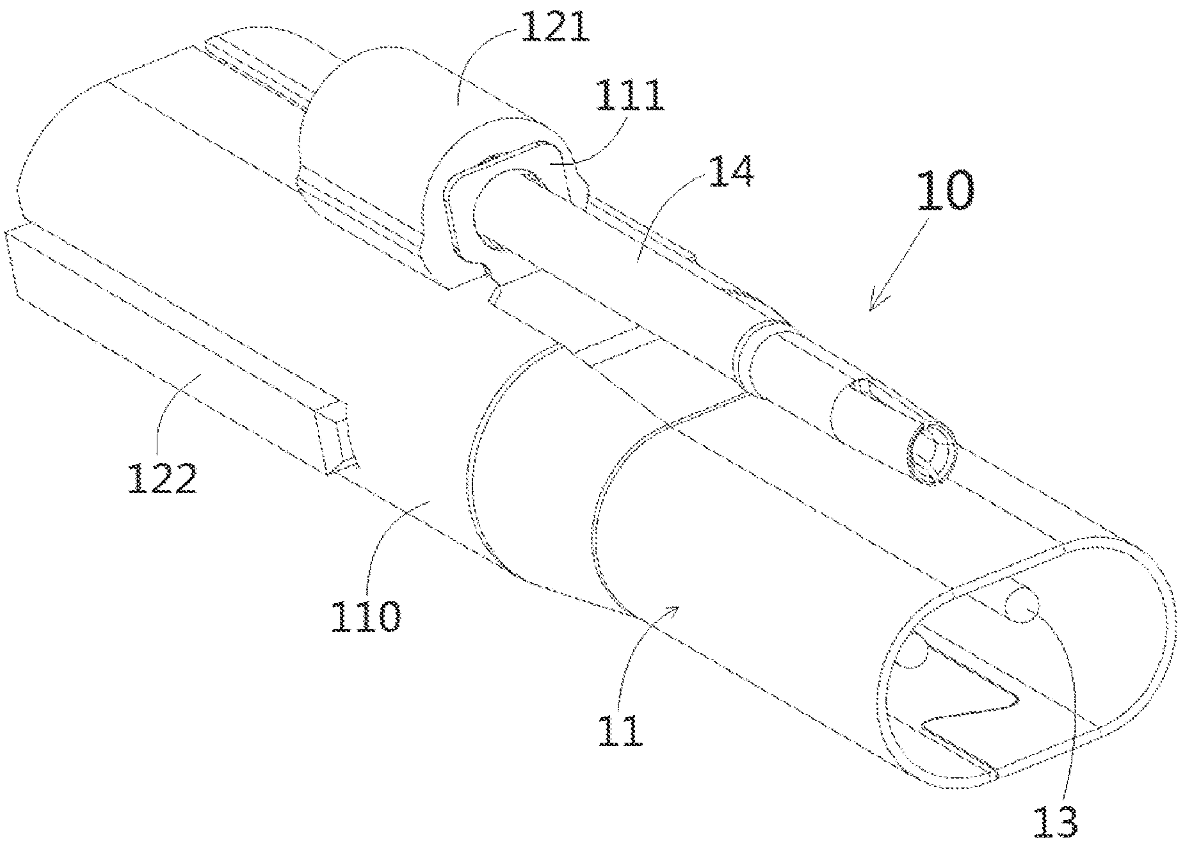
FIG. 1 shows an illustrative perspective view of a connector module according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present invention, a connector module comprises a shielding shell, an inner insulator, a signal terminal, and a ground terminal. The shielding shell includes a shell body having an inner cavity and a terminal clamping portion located outside the shell body and connected to the shell body. The inner insulator includes an insulating body housed in the inner cavity of the shell body and a terminal holding portion protruding to the outside of the shell body. The signal terminal is located in the inner cavity of the shell body and is fixed to the insulating body. The ground terminal is located outside the shell body and is inserted into the terminal holding portion of the inner insulator. The terminal clamping portion of the shielding shell clamps the ground terminal to electrically connect the ground terminal to the shielding shell.

According to another embodiment of the present invention, a connector includes the above-described connector module, an outer insulator in which the connector module is provided, and a power terminal arranged in the outer insulator and located outside the shielding shell of the connector module.

Figure 2:
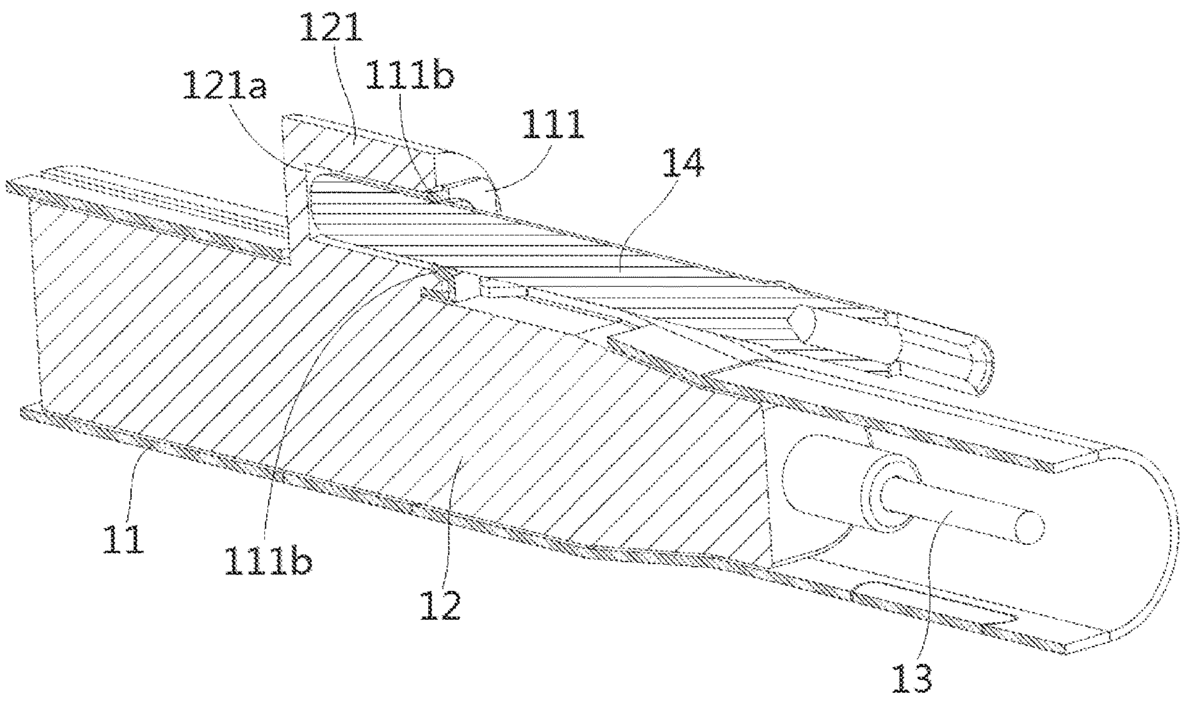
FIG. 2 shows an axial cross-sectional view of a connector module according to an exemplary embodiment of the present invention.
Figure 3:
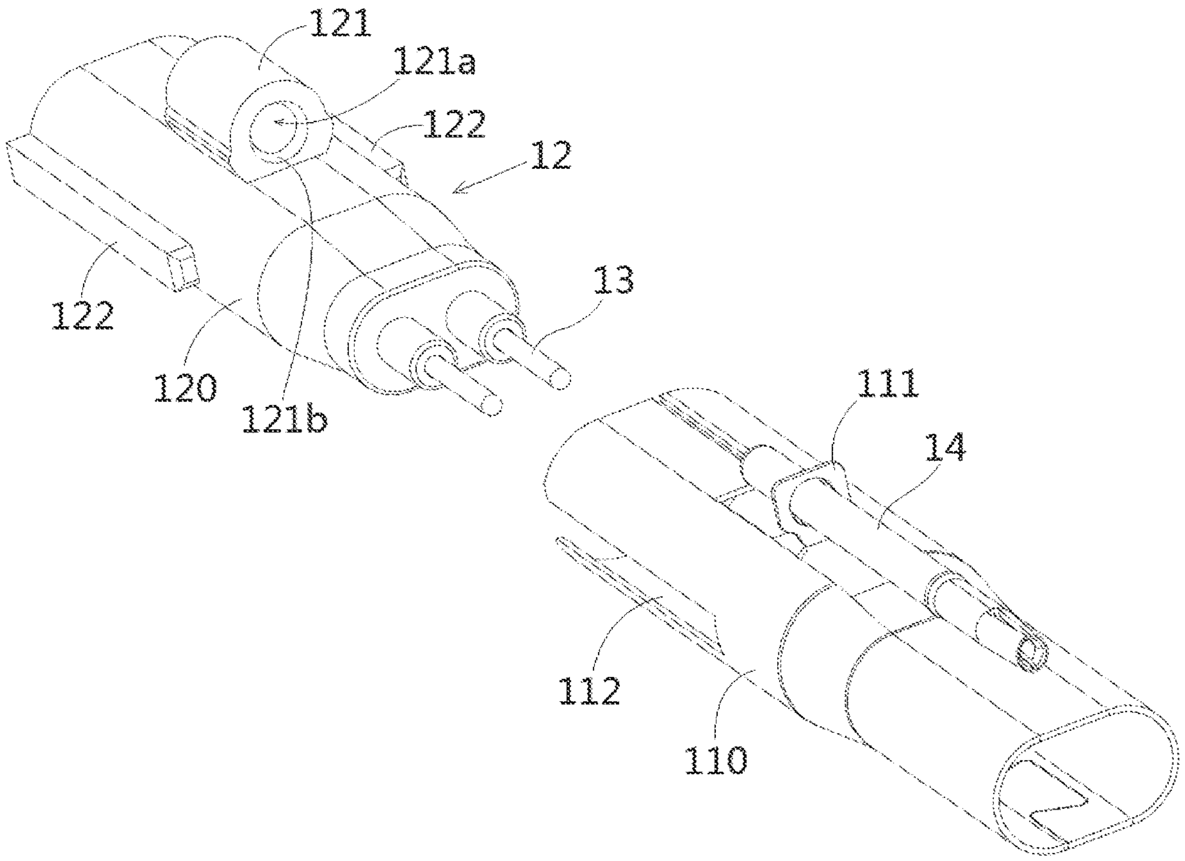
FIG. 3 shows an illustrative exploded view of a connector module according to an exemplary embodiment of the present invention.
Figure 4:
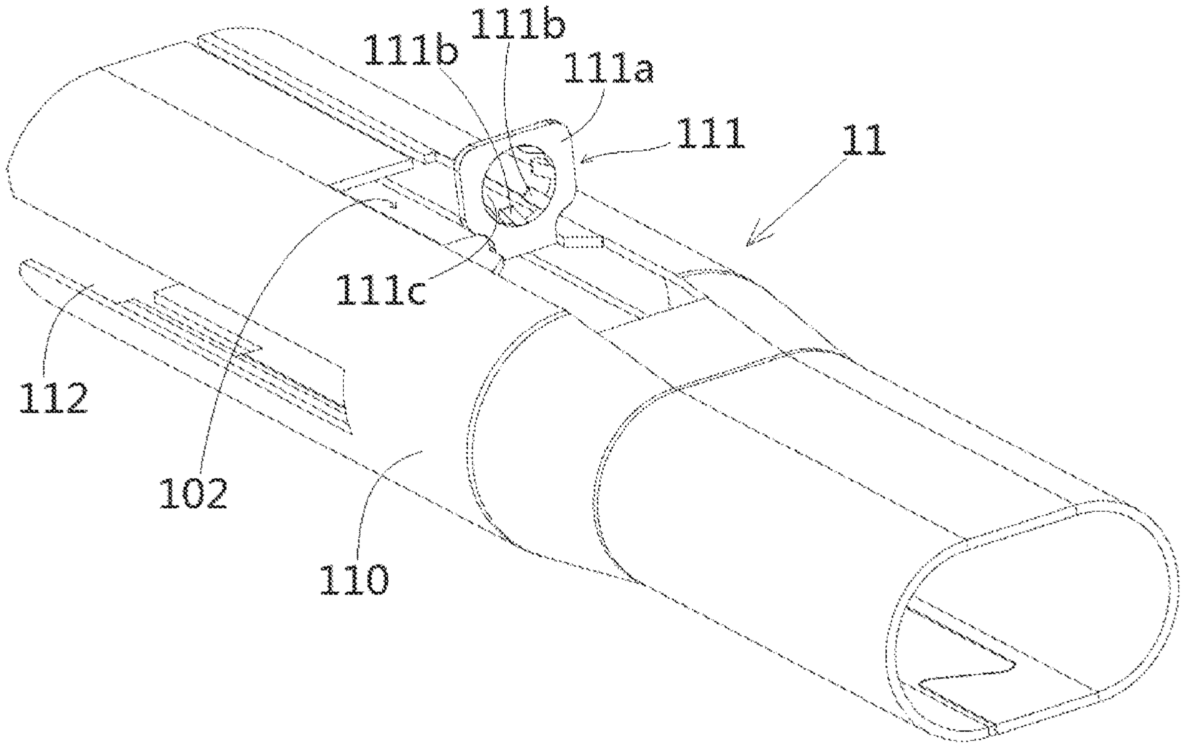
FIG. 4 shows an illustrative perspective view of a shielding shell of a connector module according to an exemplary embodiment of the present invention.
Figure 5:
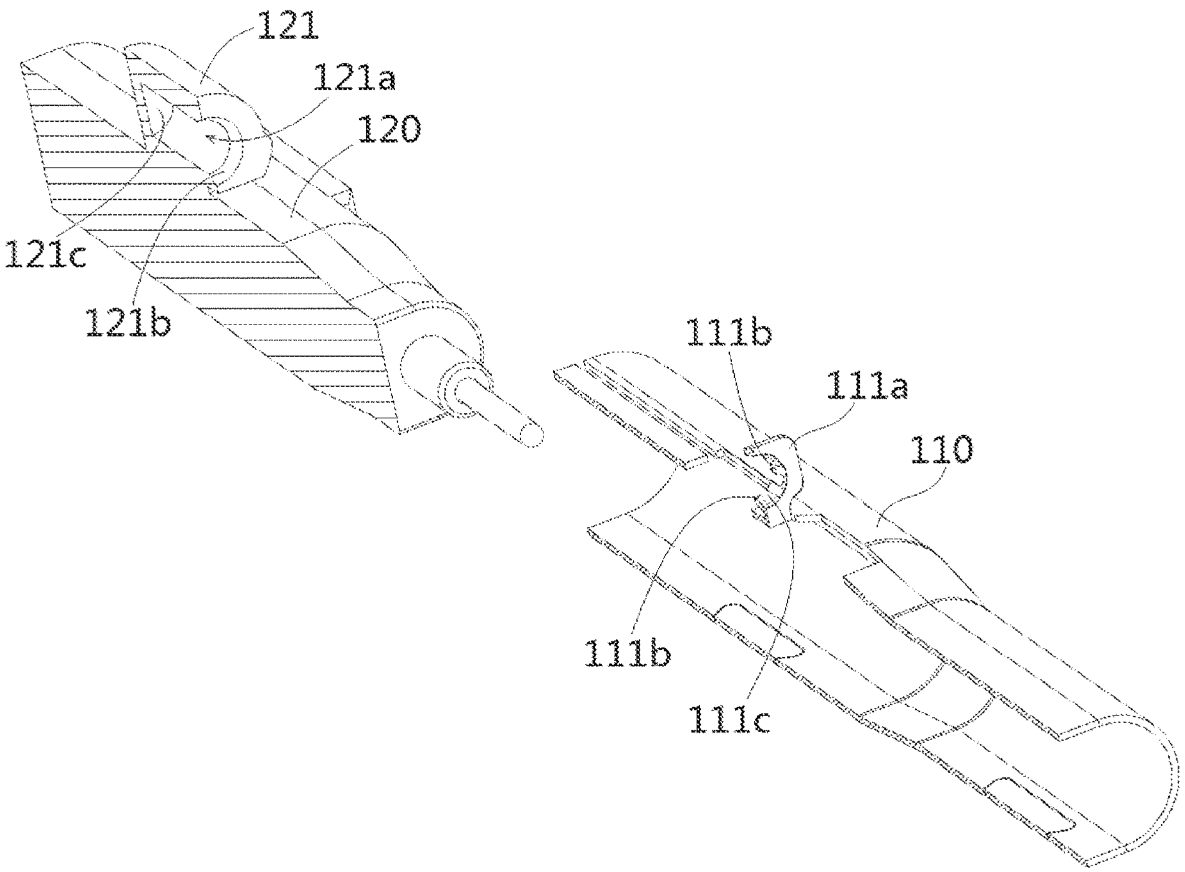
FIG. 5 shows an exploded cross-sectional view of a connector module according to an exemplary embodiment of the present invention.

FIG. 1 is an illustrative perspective view of a connector module 10 according to an exemplary embodiment of the present invention. FIG. 2 is an axial cross-sectional view of the connector module 10 according to an exemplary embodiment of the present invention. FIG. 3 is an illustrative exploded view of the connector module 10 according to an exemplary embodiment of the present invention. FIG. 4 is an illustrative perspective view of a shielding shell 11 of the connector module 10 according to an exemplary embodiment of the present invention. FIG. 5 is an exploded cross-sectional view of connector module 10 according to an exemplary embodiment of the present invention.

Referring generally to FIGS. 1-5, in an exemplary embodiment of the present invention, a connector module 10 is disclosed. The connector module 10 includes the shielding shell 11, an inner insulator 12, a signal terminal 13, and a ground terminal 14. The shielding shell 11 includes a shell body 110 having an inner cavity and a terminal clamping portion 111 located outside the shell body 110 and connected to the shell body 110. The inner insulator 12 includes an insulating body 120 housed in the inner cavity of the shell body 110 and a terminal holding portion 121 protruding to the outside of the shell body 110. The signal terminal 13 is located in the inner cavity of the shell body 110 and is fixed to the insulating body 120. The ground terminal 14 is located outside the shell body 110 and inserted into the terminal holding portion 121 of the inner insulator 12. The terminal clamping portion 111 of the shielding shell 11 clamps the ground terminal 14 to electrically connect the ground terminal 14 to the shielding shell 11.

In the illustrated embodiment, the terminal clamping portion 111 of the shielding shell 11 includes a base plate 111*a* and a plurality of elastic claws 111*b*. The base plate 111*a* is formed with a through hole 111*c* that allows the ground terminal 14 to pass through. A plurality of elastic claws 111*b* are connected to the base plate 111*a* and distributed at intervals around the through hole 111*c*. The ground terminal 14 passes through the base plate 111*a* through the through hole 111*c*, and the plurality of elastic claws 111*b* clamp the ground terminal 14. The base plate 111*a* of the terminal clamping portion 111 is perpendicular to the axis of the ground terminal 14. The elastic claw 111*b* is tilted at a predetermined angle relative to the axis of the ground terminal 14.

As shown in FIGS. 1 to 5, in the illustrated embodiment, an insertion hole 121*a* is formed on the terminal holding portion 121 of the inner insulator 12, and one end of the ground terminal 14 is inserted into the insertion hole 121*a*. A conical pressing surface 121*b* is formed on the inside of the opening of the insertion hole 121*a* of the terminal holding portion 121, so that the opening of the insertion hole 121*a* is in the shape of a horn flared outward. The plurality of elastic claws 111*b* of the terminal clamping portion 111 are located in the opening of the insertion hole 121*a*, and the conical pressing surface 121*b* compresses the plurality of elastic claws 111*b* radially against the ground terminal 14 to clamp and secure the ground terminal 14, ensuring that the ground terminal 14 does not shake, thereby ensuring reliable electrical contact between the ground terminal 14 and the shielding shell 11.

In the exemplary embodiment, the insertion hole 121*a* is a blind hole with a bottom, and the end face of one end of the ground terminal 14 rests against the bottom surface 121*c* of the insertion hole 121*a* to axially position the ground terminal 14. However, the present invention is not limited to the illustrated embodiment. For example, in another exemplary embodiment of the present invention, the insertion hole 121*a* may be a through hole that runs axially through the terminal holding portion 121. One end of the ground terminal 14 is inserted into or passed through the insertion hole 121*a*.

Still referring to FIGS. 1-5, an opening 102 is formed on the top wall of the shell body 110, and the terminal holding portion 121 of the inner insulator 12 passes through the opening 102 and protrudes to the outside of the top wall of the shell body 110. The terminal holding portion 121 of the inner insulator 12 is engaged with the opening 102 on the top wall of the shell body 110 to position the inner insulator 12 in a horizontal direction perpendicular to the axial direction of the shielding shell 11.

Axial slots 112 extending along the axial direction of the shielding shell 11 are formed on both sides of the shell body 110, and ribs 122 that cooperate with the axial slots 112 are formed on both sides of the insulating body 120. The ribs 122 of the inner insulator 12 engage with the axial slots 112 of the shell body 110 to position the inner insulator 12 in a vertical direction perpendicular to the axial direction of the shielding shell 11.

The shielding shell 11 can be an integral stamping part. This can reduce manufacturing costs. The inner insulator 12 and the signal terminal 13 are formed into an integral injection molded part, in which the signal terminal 13 is an insert, and the inner insulator 12 is an injection molded part, so that the inner insulator 12 is directly bonded to the signal terminal 13.

In another exemplary embodiment of the present invention, a connector is also disclosed. The connector includes the aforementioned connector module 10, an outer insulator and a power terminal. The connector module 10 is provided in the outer insulator. The power terminal is provided in the outer insulator and located outside the shielding shell 11 of the connector module 10. A slot suitable for inserting the connector module 10 is formed in the outer insulator, and the connector module 10 is detachably inserted into the slot of the outer insulator. A terminal slot for inserting the ground terminal 14 is formed in the outer insulator. One end of the ground terminal 14 is inserted into the terminal holding portion 121 of the inner insulator 12, and the other end is inserted into the terminal slot of the outer insulator. The connector also includes an outer shielding shell which is sheathed outside the outer insulator.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector module, comprising:

a shielding shell including a shell body having an inner cavity and a terminal clamping portion located outside the shell body and connected to the shell body;

an inner insulator including an insulating body housed in the inner cavity of the shell body and a terminal holding portion protruding to the outside of the shell body;

a signal terminal located in the inner cavity of the shell body and fixed to the insulating body; and a ground terminal located outside the shell body and inserted into the terminal holding portion of the inner insulator, the terminal clamping portion of the shielding shell clamping to the ground terminal and electrically connecting the ground terminal to the shielding shell.

2. The connector module according to claim 1, wherein the terminal clamping portion of the shielding shell includes:

a base plate defining a through hole through which the ground terminal is arranged; and a plurality of elastic claws connected to the base plate and distributed at intervals around the through-hole and gripping the ground terminal.

3. The connector module according to claim 2, wherein the base plate of the terminal clamping portion is perpendicular to the axis of the ground terminal, the elastic claw tilted at a predetermined angle relative to the axis of the ground terminal.

4. The connector module according to claim 2, wherein an insertion hole is formed on the terminal holding portion of the inner insulator, and one end of the ground terminal is inserted into the insertion hole.

5. The connector module according to claim 4, wherein a conical pressing surface is formed on the inner side of the opening of the insertion hole such that the opening of the insertion hole is in the shape of a horn flared outward, the plurality of elastic claws of the terminal clamping portion are located in the opening of the insertion hole, and the conical pressing surface presses the plurality of elastic claws radially onto the ground terminal to clamp and secure the ground terminal.

6. The connector module according to claim 4, wherein the insertion hole is a blind hole with a bottom, and the end face of one end of the ground terminal rests against the bottom surface of the insertion hole to axially position the ground terminal.

7. The connector module according to claim 4, wherein the insertion hole is a through-hole that runs axially through the terminal holding portion, and one end of the ground terminal is inserted into or is passed through the insertion hole.

8. The connector module according to claim 1, wherein an opening is formed on a top wall of the shell body, and the terminal holding portion of the inner insulator passes through the opening and protrudes to an outside of the top wall of the shell body.

9. The connector module according to claim 8, wherein the terminal holding portion of the inner insulator is engaged with the opening on the top wall of the shell body to position the inner insulator in a horizontal direction perpendicular to the axial direction of the shielding shell.

10. The connector module according to claim 1, wherein an axial slot extending along the axial direction of the shielding shell is formed on each side of the shell body, and a rib complementary to the axial slot is formed on each side of the insulating body.

11. The connector module according to claim 10, wherein the ribs of the inner insulator engages with the axial slots of the shell body to position the inner insulator in a vertical direction perpendicular to the axial direction of the shielding shell.

12. The connector module according to claim 1, wherein the shielding shell is an integral stamped part.

13. The connector module according to claim 1, wherein the inner insulator and the signal terminal are formed as integral molded part such that the inner insulator is directly bonded to the signal terminal.

14. A connector module of a connector, comprising:

a shielding shell adapted to be received into an outer insulator of the connector and including a shell body having an inner cavity and a terminal clamping portion located outside the shell body;

an inner insulator including an insulating body arranged in the inner cavity of the shell body and a terminal holding portion protruding to the outside of the shell body; and a ground terminal located outside the shell body and inserted into the terminal holding portion of the inner insulator, the terminal clamping portion of the shielding shell clamping to the ground terminal and electrically connecting the ground terminal to the shielding shell.

15. The connector module according to claim 14, further comprising a signal terminal located in the inner cavity of the shell body and fixed to the insulating body.

16. The connector module according to claim 14, wherein the shielding shell is adapted to be inserted into a slot formed in the outer insulator of the connector in a detachable manner.

17. The connector module according to claim 14, wherein a first end of the ground terminal is inserted into the terminal holding portion of the inner insulator, and a second end of the ground terminal is adapted to be inserted into a terminal slot of the outer insulator.

18. A connector module, comprising:

a shielding shell including a shell body having an inner cavity and a terminal clamping portion, the terminal clamping portion located outside the shell body and adapted to clamp to a ground terminal for electrically connecting the ground terminal to the shielding shell; and an inner insulator including an insulating body arranged in the inner cavity of the shell body and a terminal holding portion protruding outside of the shell body, the terminal holding portion adapted to receive a portion of the ground terminal.

19. The connector module according to claim 18, further comprising a ground terminal located outside the shell body and having an end inserted into the terminal holding portion of the inner insulator, the terminal clamping portion of the shielding shell clamping to the ground terminal and electrically connecting the ground terminal to the shielding shell.

20. The connector module according to claim 19, further comprising a signal terminal located in the inner cavity of the shell body and fixed to the insulating body.

* * * * *